(12) United States Patent
Vaughan et al.

(10) Patent No.: US 8,259,789 B2
(45) Date of Patent: Sep. 4, 2012

(54) METHODS AND SYSTEMS FOR PICTURE RATE REDUCTION OF STORED VIDEO WHILE UNDER CONTINUOUS RECORD LOAD

(75) Inventors: William K. Vaughan, Atlanta, GA (US); William LeBlanc, Atlanta, GA (US)

(73) Assignee: Adtech Global Solutions, Inc., Alpharetta, GA (US)

( * ) Notice: Subject to any disclaimer, the term of this patent is extended or adjusted under 35 U.S.C. 154(b) by 1521 days.

(21) Appl. No.: 11/671,483

(22) Filed: Feb. 6, 2007

(65) Prior Publication Data

US 2007/0183756 A1 Aug. 9, 2007

Related U.S. Application Data

(60) Provisional application No. 60/771,541, filed on Feb. 8, 2006.

(51) Int. Cl.
H04N 7/12 (2006.01)
G06F 15/16 (2006.01)

(52) U.S. Cl. .............. 375/240.01; 709/231; 375/240.12; 370/429

(58) Field of Classification Search .............. 375/240.24
See application file for complete search history.

(56) References Cited

U.S. PATENT DOCUMENTS

| | | | |
|---|---|---|---|
| 4,488,182 A | 12/1984 | Takahashi et al. | |
| 5,057,932 A | 10/1991 | Lang | |
| 5,247,399 A | 9/1993 | Senba | |
| 5,377,051 A | 12/1994 | Lane et al. | |
| 5,475,498 A | 12/1995 | Radice | |
| 5,754,730 A | 5/1998 | Windrem et al. | |
| 5,799,128 A | 8/1998 | Enden | |
| 5,805,821 A | 9/1998 | Saxena et al. | |
| 6,041,361 A | 3/2000 | Wilson et al. | |
| 6,453,115 B1 | 9/2002 | Boyle | |
| 6,480,669 B1 | 11/2002 | Tsumagari et al. | |
| 6,526,225 B1 | 2/2003 | Windrem et al. | |
| 6,574,421 B2 | 6/2003 | Tsumagari et al. | |
| 6,628,892 B2 | 9/2003 | Tsumagari et al. | |
| 6,798,976 B2 | 9/2004 | Tsumagari et al. | |
| 6,853,731 B1 | 2/2005 | Boyle et al. | |
| 6,901,206 B2 | 5/2005 | DaSilva | |
| 6,944,391 B2 | 9/2005 | Tsumagari et al. | |
| 6,996,117 B2 * | 2/2006 | Lee et al. | 370/429 |
| 6,996,329 B2 | 2/2006 | Tsumagari et al. | |
| 7,043,143 B2 | 5/2006 | Tsumagari et al. | |
| 7,116,353 B2 | 10/2006 | Hobson et al. | |
| 7,123,818 B2 | 10/2006 | Nakatani et al. | |
| 2003/0140159 A1 * | 7/2003 | Campbell et al. | 709/231 |

\* cited by examiner

*Primary Examiner* — Sath V Perungavoor
*Assistant Examiner* — Mohammed Jebari
(74) *Attorney, Agent, or Firm* — Woodcock Washburn LLP

(57) ABSTRACT

Provided is a method and system for splitting a video stream into X minute video segments and further dividing those video segments into M multiplex files. Each multiplex file can have a Time to Live (TTL). This allows for part of the video to be deleted from disk by just removing a single multiplex file. The remaining multiplex files can be combined to play back the video at a reduced sample rate.

68 Claims, 5 Drawing Sheets

METHODS AND SYSTEMS FOR PICTURE RATE REDUCTION OF STORED VIDEO WHILE UNDER CONTINUOUS RECORD LOAD

CROSS REFERENCE TO RELATED PATENT APPLICATION

This application claims priority to U.S. Provisional Application No. 60/771,541 filed Feb. 8, 2006, herein incorporated by reference in its entirety.

BACKGROUND

In the surveillance video market, typical MPEG2 streams range from 3 to 6 Mbps and typical MJPEG streams can exceed 20 Mbps. Storing these streams requires significant use of two finite resources: disk space and disk bandwidth. To allow streams to be stored for long periods of time, system administrators typically store the video at reduced frame rates. This allows more video to be kept, but the playback quality is reduced. Since the need for stored video typically reduces over time, users want to keep full rate video for some number of hours, and then have that same video kept at a lower rate for some period of time.

The current state of the art is to record a high frame rate file and a low frame rate file. The high frame rate file can then be manually removed to save disk space. This has the disadvantage of keeping more video than is needed on disk and using more bandwidth to store that video. The other approach is to read the video from disk, reduce it, and then store the reduced video back to disk. This is very difficult to do when a system is under constant load unless a percentage of the bandwidth is reserved for this purpose.

The goal is to reduce this stored video while the system is under full load. What is needed is a way to remove the video that is no longer needed from disk.

SUMMARY

Described herein is a method for splitting a video stream into X minute video segments and further dividing those video segments into M multiplex files. Each multiplex file can have a Time to Live (TTL). This allows for part of the video to be deleted from disk by automatically removing a single multiplex file once the TTL has expired. The remaining multiplex files can be combined to play back the video at a reduced picture rate.

Additional advantages will be set forth in part in the description which follows. The advantages will be realized and attained by means of the elements and combinations particularly pointed out in the appended claims. It is to be understood that both the foregoing general description and the following detailed description are exemplary and explanatory only and are not restrictive, as claimed.

BRIEF DESCRIPTION OF THE DRAWINGS

The accompanying drawings, which are incorporated in and constitute a part of this specification, illustrate embodiments and together with the description, serve to explain the principles of the methods and systems:

FIG. 4 illustrates construction of an exemplary sequence guide;

DETAILED DESCRIPTION

Figure 1:
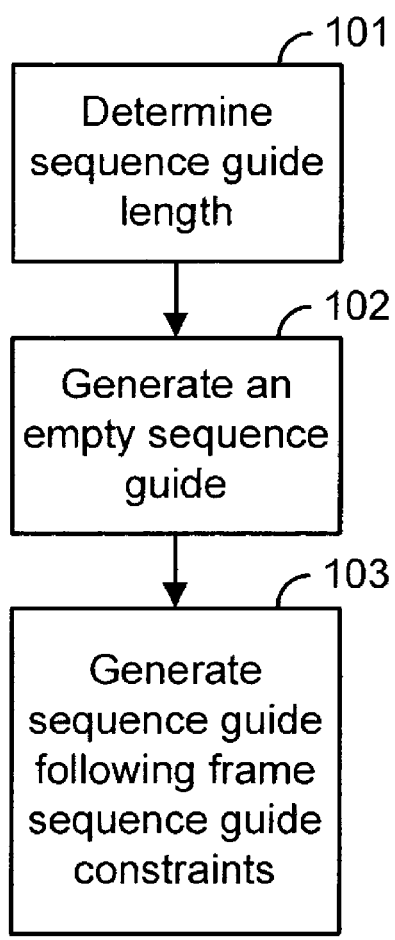
FIG. 1 illustrates steps in an exemplary method of generating a sequence guide.

Before the present methods and systems are disclosed and described, it is to be understood that the methods and systems are not limited to specific synthetic methods, specific components, or to particular compositions, as such may, of course, vary. It is also to be understood that the terminology used herein is for the purpose of describing particular embodiments only and is not intended to be limiting.

As used in the specification and the appended claims, the singular forms "a," "an" and "the" include plural referents unless the context clearly dictates otherwise. Thus, for example, reference to "an encoder" includes mixtures of encoders and the like.

Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

The present methods and systems may be understood more readily by reference to the following detailed description of preferred embodiments and the Examples included therein and to the Figures and their previous and following description.

I. MPEG

In some embodiments, video data may be encoded into MPEG compatible data streams. MPEG is a video compression standard that defines operation of an MPEG video encoder and decoder and the composition of an MPEG stream. The video data within the MPEG stream represents a sequence of video pictures. The amount of information used in MPEG to represent a picture of video varies greatly depending on factors such as visual content including color space, temporal variability, spatial variability, the human visual system, and the techniques used to compress the video data.

MPEG data may be encoded using three types of pictures: Intra-picture ("I-picture") data, forward Predicted picture ("P-picture") data, and Bi-directional predicted picture ("B-picture") data. I-picture data includes all of the information required to completely recreate a picture. P-picture data contains information that represents the difference between a picture and the picture that corresponds to a previous I-picture or P-picture data. B-picture data contains information that represents relative movement between preceding I-picture data or P-picture data and succeeding I-picture data or P-picture data. MPEG comprises various encoding standards, including MPEG 1, MPEG 2, and MPEG 4 Part 2. MPEG 1 is defined in the international standard ISO/IEC 11172, MPEG 2 is defined in the international standard ISO/IEC 138181, and MPEG 4 Part 2 is defined in the international standard ISO/IEC 14496. These standards are herein incorporated by reference in their entirety.

For the purposes of this document, whenever MPEG is mentioned, it may refer to MPEG 1, 2, 4 Part 2, or any other similar MPEG format or other video format.

II. M-JPEG

In some embodiments, video data may be encoded into Motion JPEG (M-JPEG) compatible data streams. M-JPEG is a video codec where each video picture is separately compressed into a JPEG image. The resulting quality of the video compression is independent from the motion in the image.

There is no official standard for the transmission of M-JPEG. Each encoder may define a proprietary transmission scheme.

III. Embodiments of the Systems and Methods

The systems and methods disclosed can divide one or more video streams into X minute video segments. X can be any number desired, for example, 2, 3, 4, 5, 6, and the like. Each video segment can comprise multiple files (multiplex files), each multiplex file having a portion of the video. The multiplex files are re-created for each video segment. This allows part of a video segment to be deleted by removing one or more of the multiplex files belonging to that video segment.

Multiplexing each X minute video segment into multiple multiplex files allows two finite resources, disk space and disk bandwidth, to be used more efficiently. Disk space can be freed by deleting the larger sized multiplex files while still retaining the smaller sized multiplex files. Disk bandwidth can be used efficiently when the video is played back by more closely matching the requested play back picture rate. If a user wants to play back a video at ⅛ picture rate to reduce traffic on the network, the system can play back the specific file or files that most closely match the requested playback rate, rather than forcing the system to read the full recorded video rate from disk, reducing, then sending the requested ⅛ rate over the network (an inefficient use of disk bandwidth).

A. Video Picture

As described herein, a video stream may be comprised of a sequence of video pictures. Each video picture may be comprised of one or more Protocol Data Units (PDUs) (a PDU is the smallest transmission unit sent from an encoder). There are several different types of pictures depending on the video type. For example, M-JPEG streams are composed of spatially encoded pictures only. As described herein these pictures are referred to as I pictures. These I pictures continuously repeat. As another example, MPEG streams are composed of spatially encoded I pictures and optional temporally encoded B and P pictures in various combinations defined by a Group of Pictures (GOP). The GOP may continuously repeat.

A Video Picture may be defined as an I, B or P picture, or combination thereof. These pictures contain one or more PDUs as defined by the encoder and/or video type.

B. Multiplex (MPLEX) Picture

An MPLEX Picture is defined as one or more Video Pictures and can be delineated by MPLEX Headers. An MPLEX Header can be added by the video layer when the video is recorded and removed during playback. Each MPLEX picture must have at least one MPLEX Header that signifies the start of an MPLEX Picture and an MPLEX Picture may contain more than one MPLEX Header if the entire MPLEX Picture cannot be buffered. An MPLEX Header can have one or more fields.

An exemplary MPLEX Header is described in Table 1. By way of example, a Length field in the MPLEX Header can specify how many bytes to the next MPLEX Header and this size may be limited by internal buffer sizes. The MPLEX Header provides a generic way for the Multiplex software layer to separate the video stream by MPLEX Picture into multiple files independent of video type (M-JPEG or MPEG). The video layer has the freedom to group video pictures into one or more MPLEX Pictures.

TABLE 1

Exemplary MPLEX Header

| | |
|---|---|
| Magic Number | Indicates an MPLEX header. Filled in by video layer. |
| Length | Number of bytes to next MPLEX Header. Filled in by video layer. |
| Picture Boundary | True or False. If True, the MPLEX Header indicates the start of a new MPLEX picture, otherwise this MPLEX Header is a continuation of the previous MPLEX Picture. Filled in by video layer. |
| Picture Sequence Number | Increments on each MPLEX Picture per multiplex file. This value is used to detect skipped pictures within a file which would indicate a loss of synchronization. Filled in by MPLEX layer. |

An MPLEX Picture may start with an MPLEX Header that has the Picture Boundary field set to TRUE. The MPLEX Picture ends when a subsequent MPLEX Header has the Picture Boundary field set to TRUE. An MPLEX Picture may include more than one MPLEX Header as long as the Picture Boundary field in those headers is set to FALSE.

An MPLEX Picture may contain one or more video pictures (I, B or P pictures). For example, all of the B and P video pictures within an MPEG GOP may be grouped into one MPLEX Picture by the MPEG video layer.

C. MPLEX Picture Index (PIDX) File

As the video stream is written to disk, a picture index file (PIDX File) can also be written to disk. There can be, for example, one PIDX File per X minute video segment. When each MPLEX Picture is encountered in the video stream (i.e.: MPLEX Header with Picture Boundary set to True), a PIDX File Entry is written to the PIDX File. An exemplary PIDX File Entry is described in Table 2.

TABLE 2

Exemplary PIDX File Entry

| | |
|---|---|
| Mplexed Files | The original number of multiplex files (M). This can be used to determine the original Sequence Guide. |
| Sequence Index | Position in the sequence guide when this entry was written. |
| Stream Offset | Byte offset of the given MPLEX Picture in the original video stream. |
| File Offset | Byte offset in the corresponding multiplex file that the MPLEX Picture was written to. The multiplex file can be derived from the Sequence Index. |

The PIDX File can comprise byte positions for each MPLEX Picture in each multiplex file that corresponds to the stream position in the original non-multiplexed video stream. The picture index file allows the system to efficiently translate a byte position in the original video stream to the corresponding byte position in a particular multiplex file. This can allow the system to support random access to the video stream.

The PIDX File may be stored in a flat file or a database. During playback, the PIDX File can be read from disk and cached in memory for efficient random access to the corresponding video segment.

D. Recording

As the video stream is recording, pictures are detected and written to specific multiplex files in a specific sequence. In one embodiment, pictures can comprise MPLEX Pictures.

The specific sequence depends on the number of files to be multiplexed in the video segment. The length of the video segment can be any length of time, such as, for example, 30 seconds, 1 minute, 2 minutes, 3 minutes, 4 minutes, 5 minutes, 6 minutes, or 7 minutes, 1 hour, 2 hours, 3 hours, 4 hours, 5 hours, and so on. Furthermore, the length of the video segment can vary within a video stream. When the video segment time elapses, the multiplex files for that video segment and the PIDX File for that video segment can be closed and new multiplex files and PIDX files can be created. Alternatively, one set of multiplex files can be generated for an entire stream, effectively setting X to the length of the stream. The multiplex files can be closed on picture boundaries. Picture boundaries can be set by any means known in the art for indicating a picture boundary. A picture boundary can be a MPLEX Picture boundary so as to prevent MPLEX Pictures from spanning video segments.

Assume M is the number of multiplex files per video segment and M>1. Each element in the following sequence represents a multiplex file and the fraction of MPLEX Pictures sent to that file. By way of example, each multiplex file can be represented by a letter. The first multiplex file can be represented by "A," the second multiplex file can be represented by "B," and so on.

$$\sum_{x=1}^{x<M} \frac{1}{2^x} + \frac{1}{2^{M-1}} = 1 \qquad \text{Formula 1:}$$

By way of example, and not limitation, assume M=6. That will create six multiplex files for each video segment: File A, File B, File C, File D, File E and File F.

TABLE 3

Multiplex Example

| Time to Live (TTL Examples) | Fraction of MPLEX Pictures per file per Formula 1 with M = 6 | X Minute Video Segment (V1) | X Minute Video Segment (V2) | X Minute Video Segment (Vn) |
|---|---|---|---|---|
| 12 hours | 1/2 | File A_V1 | File A_V2 | File A_Vn |
| 2 days | 1/4 | File B_V1 | File B_V2 | File B_Vn |
| 1 week | 1/8 | File C_V1 | File C_V2 | File C_Vn |
| 1 month | 1/16 | File D_V1 | File D_V2 | File D_Vn |
| 6 months | 1/32 | File E_V1 | File E_V2 | File E_Vn |
| 1 year | 1/32 | File F_V1 | File F_V2 | File F_Vn |
|  |  | V1 Picture Index File | V2 Picture Index File | Vn Picture Index File |

Table 3 shows each video segment broken down into six multiplex files with each multiplex file having an associated Time to Live (TTL). The fraction of MPLEX Pictures sent to each multiplex file is also shown. The system can reduce the video that is stored on disk by deleting individual multiplex files without incurring the overhead of reading and re-writing the existing video. There is no limit to the number of multiplex files that comprise the video segment; however, six multiplex files provides a 1/32 file that translates to roughly one picture per second of stored M-JPEG video or MPEG I video picture only video (assuming each MPLEX Picture represents one video picture). Note that multiplex Files E and F have the same fraction of MPLEX Pictures, but they are not the same MPLEX Pictures.

i. M-JPEG Recording

M-JPEG video streams contain only spatially encoded video pictures. This allows for a one to one mapping between MPLEX Pictures and video pictures.

ii. MPEG 1/2/4 Recording

MPEG 1/2/4 video streams have I pictures and optional B and P pictures defined by a Group of Pictures (GOP) structure. If no B or P pictures are present, then the video stream is very similar to M-JPEG. A typical GOP may be IBBPBBPBB, but there are many variations as defined by the MPEG specifications. The GOP generally repeats. To multiplex this sequence of pictures, the B's and P's for each GOP are grouped as one MPLEX Picture by the MPEG video layer. The MPLEX Picture that contains the B and P video pictures are then stored in the multiplex file with the shortest TTL, for example File A, so they are the first to be deleted. The B and P video pictures are grouped together because they are temporally encoded and depend on adjacent video pictures. If the adjacent video picture was deleted due to a file TTL expiring, then the B and P pictures could not easily be displayed. The I pictures are spatially encoded and do not depend on any adjacent pictures so they do not need to be grouped.

To group all of the B and P pictures from a GOP into one MPLEX Picture, the MPLEX Header for the first B in the above GOP must have the Picture Boundary field set to True and the next Picture Boundary is not set to True until the next I video picture is reached. The remaining multiplex files (Files B-F in Table 3) contain only MPLEX Pictures that contain single I pictures. By sending all of the B and P video pictures within each GOP to multiplex File A, multiplex File A may contain significantly more or less than ½ the video from the video segment depending on the GOP structure.

iii. Sequence Guide

Each successive MPLEX Picture may be written to (and read from) the appropriate multiplex file by following a specific Sequence Guide. The Sequence Guide can be derived from the number of multiplex files requested and can be continuously repeated until the video stream is no longer recorded. The Sequence Guide provides a pattern in which each subsequent multiplex file contains half the MPLEX Pictures of the previous multiplex file (as shown in Table 3). The exception is that the last two multiplex files have the same number of MPLEX Pictures.

The Sequence Guide can be any form of data structure. For example, the Sequence Guide is described herein as a string of characters in a table, each character representing a multiplex file and the order of the characters indicating the order of multiplex files to which an MPLEX Picture must be written.

FIG. 1 illustrates exemplary steps in constructing the Sequence Guide. At block 101, the length of the Sequence Guide is determined. The length of the Sequence Guide can be determined by $2^{M-1}$ where M is the number of multiplex files. At block 102, an empty table is generated comprising a number of empty slots equal to the Sequence Guide length. Then, at block 103, the Sequence Guide is generated following a Sequence Guide Constraint. The Sequence Guide Constraint can be, for X=1 to M (where 1 starts with multiplex file A), reference multiplex file X in every other empty slot beginning with the first available empty slot. When X equals M, only 1 empty slot remains and is taken by that multiplex file.

FIG. 4 illustrates an exemplary Sequence Guide generated according to this method for video segments divided into six multiplex files. At 401, an empty table of 32 empty slots is generated. At block 402, multiplex file A is assigned to every other empty slot. At block 403, multiplex file B is assigned to every other empty slot. At block 404, multiplex file C is assigned to every other empty slot. At block 405, multiplex file D is assigned to every other empty slot. At block 406, multiplex file E is assigned to the first empty slot. At block 407, multiplex file F is assigned to the last empty slot. Block 407 illustrates the final Sequence Guide. Sequence Guide 407 results in the following number of MPLEX Pictures per multiplex file: multiplex file A: ½ MPLEX Pictures, multiplex file B: ¼ MPLEX Pictures, multiplex file C: ⅛ MPLEX Pictures, multiplex file D: ¹⁄₁₆ MPLEX Pictures, multiplex file E: ¹⁄₃₂ MPLEX Pictures, multiplex file F: ¹⁄₃₂ MPLEX Pictures.

EXAMPLES

Figure 2:
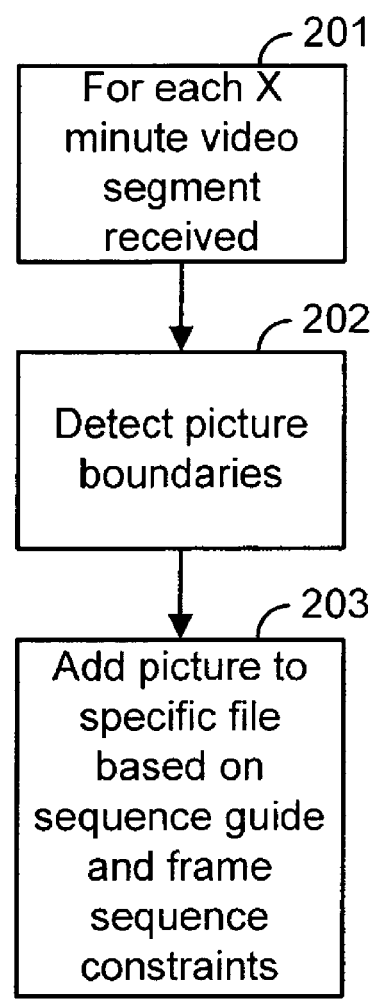
FIG. 2 illustrates steps in an exemplary method of storing a video stream.

M=2
File A: ½ MPLEX Pictures, File B: ½ MPLEX Pictures
Sequence Length: 2
Sequence Guide: A, B
M=3
File A: ½ pictures, File B: ¼ MPLEX Pictures, File C: ¼ MPLEX Pictures
Sequence Length: 4
Sequence Guide: A, B, A, C
M=4
File A: ½ pictures, File B: ¼ MPLEX Pictures, File C: ⅛ MPLEX Pictures, File D: ⅛ MPLEX Pictures
Sequence Length: 8
Sequence Guide: A, B, A, C, A, B, A, D
M=5
File A: ½ pictures, File B: ¼ MPLEX Pictures, File C: ⅛ MPLEX Pictures, File D: ¹⁄₁₆ MPLEX Pictures, File E: ¹⁄₁₆ MPLEX Pictures
Sequence Length: 16
Sequence Guide: A, B, A, C, A, B, A, D, A, B, A, C, A, B, A, E
M=6
File A: ½ MPLEX Pictures, File B: ¼ MPLEX Pictures, File C: ⅛ MPLEX Pictures, File D: ¹⁄₁₆ MPLEX Pictures, File E: ¹⁄₃₂ MPLEX Pictures, File F: ¹⁄₃₂ MPLEX Pictures
Sequence Length: 32
Sequence Guide: A, B, A, C, A, B, A, D, A, B, A, C, A, B, A, E, A, B, A, C, A, B, A, D, A, B, A, C, A, B, A, F FIG. 2 illustrates exemplary steps in a generalized embodiment of a method for assigning pictures of a video segment into multiplex files. At block 201, a new video segment is received (each video segment can be processed). At block 202, picture boundaries are detected, resulting in a detected picture. At block 203, the detected picture is added to a multiplex file based on a sequence guide and a sequence constraint. The method enables picture rate reduction of stored video while under continuous record load.

Figure 3:
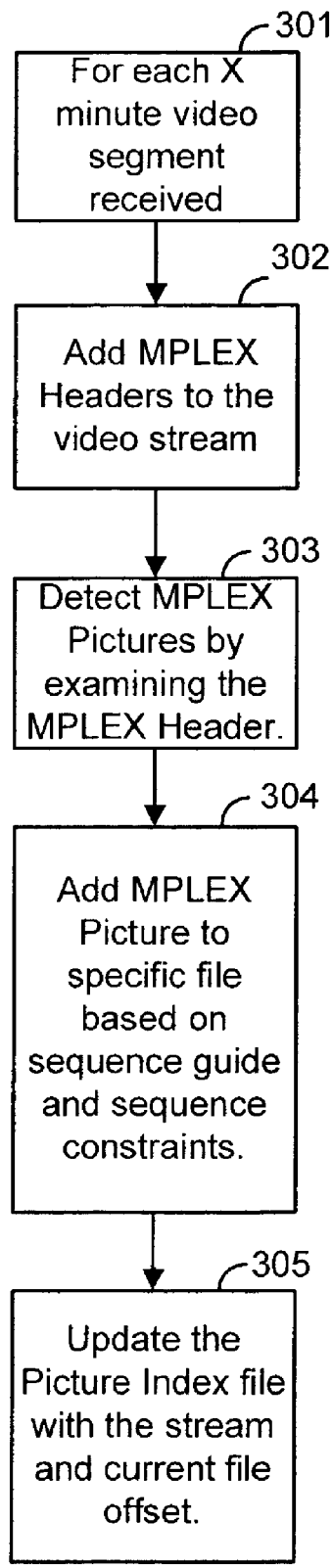
FIG. 3 illustrates steps in an exemplary method of storing a video stream.

FIG. 3 illustrates exemplary steps in an embodiment of a method for assigning MPLEX Pictures to specific multiplex files as the video stream is being recorded. At block 301, a new video segment is received (each video segment can be processed). At block 302, MPLEX Headers are added to the video stream by the M-JPEG or MPEG video layer. The video layer fills in the Magic Number, Length and Picture Boundary fields of the MPLEX Header. The frequency of the MPLEX Headers depends on video PDU sizes, video layer buffer sizes and video type (M-JPEG or MPEG). The data stream is then sent to the multiplex software layer. At block 303, the multiplex software layer detects MPLEX Pictures by examining the MPLEX Header Picture Boundary field. At block 304, the detected MPLEX Picture is added to a specific multiplex file based on a Sequence Guide and a Sequence Constraint. The Picture Sequence Number for that multiplex file is incremented within the MPLEX Header. At block 305, the Picture Index File is updated with the current stream position and the file position where the last MPLEX Picture was written. By way of example, the Sequence Constraint can be that each picture is stored in the next multiplex file as indicated by the Sequence Guide. Once the end of the Sequence Guide is reached, the Sequence Guide can be repeated.

E. Time to Live (TTL)

The system can reduce the video that is stored on disk by automatically deleting individual multiplex files without incurring the overhead of reading and re-writing the existing video. Each multiplex file can be assigned a "Time to Live" (TTL) that represents the amount of time until that multiplex file is deleted and no longer available to the system. Multiplex files with more MPLEX Pictures have smaller TTLs so they are deleted first. In the example provided, when deleting multiplex files, higher letters are deleted before lower letters. In other words, the Time To Live for multiplex file A must be less than or equal to the TTL for multiplex file B which must be less than or equal to the TTL for multiplex file C, etc.

File TTLs: multiplex file A<=multiplex file B<=multiplex file C<=multiplex file D<=multiplex file E<=multiplex file F<= . . . <=multiplex file Z Deleting multiplex files in this order assures that the larger size multiplex files are deleted before the smaller size multiplex files. This guarantees an orderly recovery of disk space while slowly reducing the available number of video pictures in a video segment. This also assures the "additive" property of the remaining multiplex files. The TTLs may be adjusted as long as the above constraint is satisfied.

F. Playback

There are several options available to playback a multiplexed video segment depending on the desired playback video picture rate and the available multiplex files within the video segment. The goal is to not read any more data from disk than is needed to match the requested playback picture rate. A single multiplex file can be played back or multiple multiplex files may be combined to achieve a higher playback picture rate. The same Sequence Guide used to create the multiplex files is used to combine the multiplex files for playback.

i. Additive Property of Multiplex Files

The Sequence Guide and the TTL file deletion logic guarantee that any remaining multiplex files within a video segment are additive. For example, assume there are six original multiplex files (File A-F) as shown in Table 3. File A has the same number of MPLEX Pictures as multiplex Files B-F combined. Multiplex File B has (statistically) the same number of MPLEX Pictures as multiplex Files C-F combined. Stated more generically, the number of MPLEX Pictures in multiplex File X equals the number of MPLEX Pictures in multiplex Files X+1 through multiplex File M as described by Formula 1 and shown by example in Table 3.

This property allows multiplex files to easily be combined to more closely match a desired playback picture rate. For example, assuming the M-JPEG case of one video picture per MPLEX Picture and the user wants to play back at ¼ of the recorded picture rate, then multiplex File B from Table 3 could be read to satisfy the request. If multiplex File B has been deleted, then multiplex File C through multiplex File F combine to make the ¼ picture rate. All four of these multiplex files can be opened and combined to match the desired playback rate.

ii. Using the Sequence Guide to Read Multiple Files

The same Sequence Guide may be used to read MPLEX Pictures from multiplex files as was used to write the MPLEX Pictures. To use the same Sequence Guide, the original number of multiplex files (M) must be known. This data can be stored in an outside database or recovered from the PIDX File.

Once the Sequence Guide is known, the appropriate number of multiplex files (depending on the desired playback picture rate) from that Sequence Guide are opened for the given video segment. MPLEX Pictures are then read from the multiplex files in the order of the Sequence Guide. If a multiplex file is skipped either because it is deleted or the data is not needed to satisfy the read request, then that index in the Sequence Guide is skipped.

An entire MPLEX Picture can be read from each multiplex file in the order specified by the Sequence Guide. This process can be repeated until no more data is available in any of the multiplex files for that video segment. At that point End of File (EOF) is reached for that X minute video segment and the next X minute video segment can be opened. The user can stop the playback at any point or issue VCR style controls that cause the stream position to change. VCR style controls include fast forward, rewind, pause, play, jump, etc.

iii. Finding File Positions Using the PIDX File

Since there now may be M multiplex files on disk per video segment instead of one large video file, setting the stream position is more complicated. The PIDX File can be used to efficiently maintain file positions for each multiplex file.

If byte position S is requested in the original video stream, a binary search of the PIDX File using Stream Offset as the key can quickly reveal which multiplex file contains the MPLEX Picture associated with the requested stream position S. The byte position within that multiplex file that contains the associated MPLEX Picture is also known. Now the remaining multiplex file positions can be updated by moving forward in the PIDX file until all remaining multiplex file positions have been set. This allows the subsequent MPLEX Picture to be read from the next file in the Sequence Guide.

iv. Lost Synchronization

The MPLEX Header is used to maintain synchronization while reading files from a video segment. Each read stream is "locked" to the MPLEX Header. To achieve initial "lock", the PIDX File associated with the given video segment may need to be searched to determine each starting file position for the requested stream position. For example, if the user wants to start playing at stream position S, then the PIDX file that contains stream position S is searched. Once the stream position is found, then each file position offset (for File A, B, C, etc) can be set. The stream position represents the byte count of the video stream and is maintained across video segments. The stream position allows the user to move around in the video. After initial lock is achieved, the MPLEX Header Length field allows synchronization to be maintained.

If the MPLEX Header is not where it is supposed to be, or if the Picture Sequence Number changes within an MPLEX Picture, then data was lost during transmission to disk. This results in lost synchronization and file combining cannot occur for that video segment. However, a single multiplex file can still be read. This would just result in a lower picture rate (unless the video is up-sampled).

v. M-JPEG Playback

M-JPEG has the freedom to playback video pictures at various rates (depending on the encoder and decoder). The system can closely match a requested playback picture rate to the multiplex files stored on disk since there is a one to one mapping between video pictures and MPLEX Pictures. For example, if the user requests playback at full available rate, then the system can open all available multiplex files and de-multiplex them back into the original recorded picture rate. If the original recorded picture rate was less than 30 pictures per second or if one or more of the files were deleted, then the system can up-sample that video segment to the requested picture rate. Up-sampling involves repeating video pictures to increase the picture rate. As long as one file is still available on disk, the system will be able to satisfy any picture rate playback request.

M-JPEG multiplex files are "additive" on playback. If two $\frac{1}{32}$ files are present and one $\frac{1}{16}$ file is present, then the system can combine these files into a single $\frac{1}{8}$ picture rate stream. If the user requests $\frac{1}{2}$ picture rate, then the system will attempt to play back the single $\frac{1}{2}$ picture rate file if it is present. If that file is not present, the system will add the remaining files together to get as close to the $\frac{1}{2}$ picture rate as possible. If all of the files are present except for the $\frac{1}{2}$ picture rate file, then the remaining files add to $\frac{1}{2}$ picture rate and the request is matched. Otherwise, the video is up-sampled to match the request.

vi. MPEG Playback

MPEG has much stricter standards for playback picture rates. These standards are strictly defined in the MPEG specifications. As used herein, the playback picture rate may match the recorded picture rate. However, this does not mean the recorded bit rates may match the playback bit rates. Missing video pictures can be substituted with a special type of P picture, referred to herein as an Identity P picture, thereby providing up-sampling. The Identity P picture is a MPEG compliant non-coded, motion compensated P-frame picture with zero motion. Identity P pictures tell the decoder that this picture is no different than the last reference picture (I or P picture), so the reference picture is displayed again. Identity P pictures can be substituted for all missing pictures, such that the resulting picture rate closely resembles the original source stream picture rate and such that the stream remains MPEG compliant. The system may introduce multiple Identity P pictures between I pictures to increase the picture rate while decreasing the bit rate.

MPEG streams contain timing information that reflects the encoded picture rate. This timing information is used by the system to determine when to send pictures on playback. As files are deleted due to TTL expirations, "holes" are created in the picture timing. Repeating the previous I picture or inserting Identity P pictures can be used to fill these timing holes so the encoded picture rate is maintained.

As with MJPEG, the user can specify how much data to read from disk on playback. Up-sampling is used to re-create the original record picture rate. For example, the user may request that the $\frac{1}{4}$ I picture (File C) be played from disk. If that file is not present, then all of lower rate files are opened as with M-JPEG.

G. Exemplary Operating Environments

Figure 5:
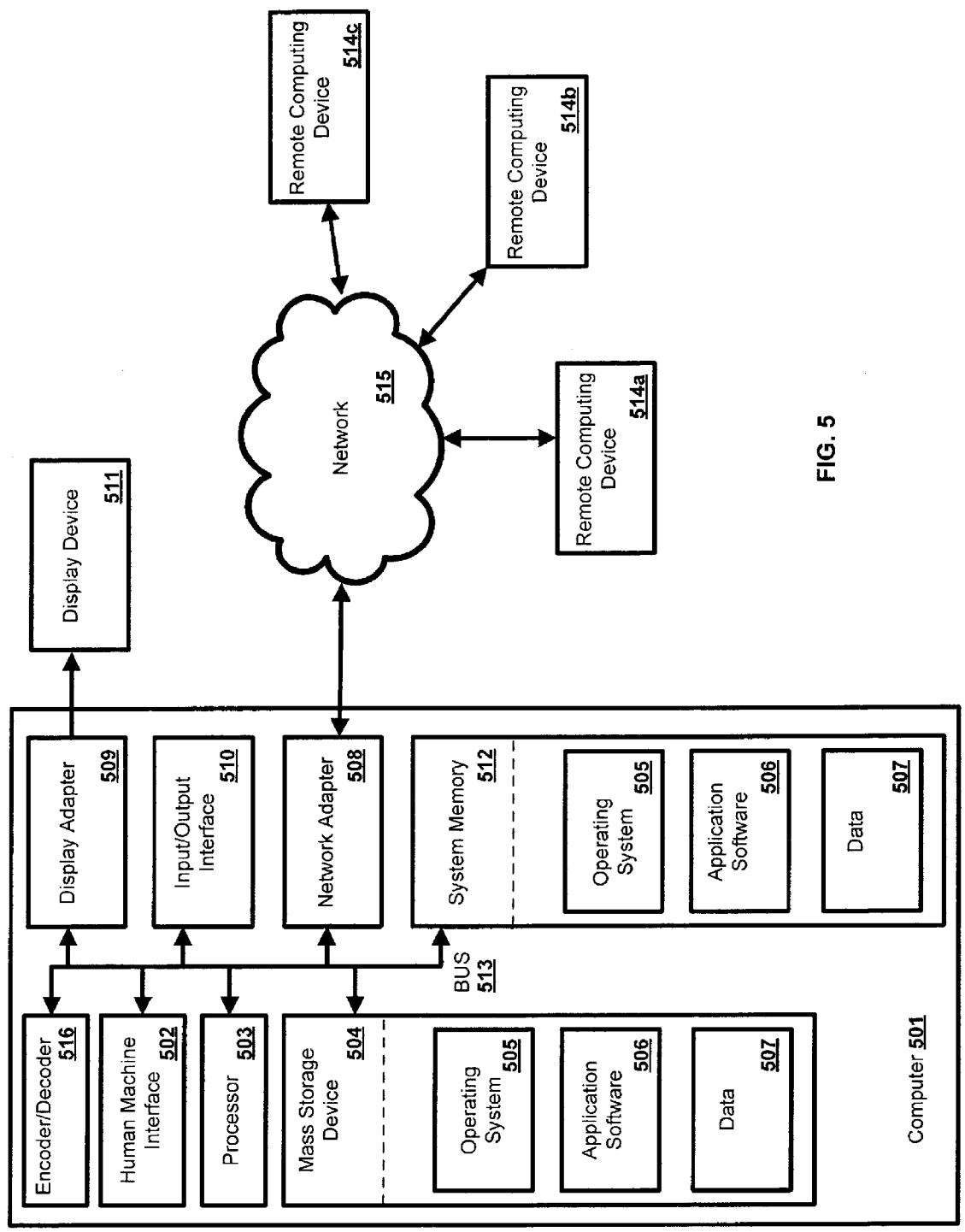
FIG. 5 illustrates an exemplary operating environment.

FIG. 5 is a block diagram illustrating an exemplary operating environment for performing the disclosed method. This operating environment is only one example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

The method can be operational with numerous other general purpose or special purpose computing system environments or configurations. Examples of well known computing systems, environments, and/or configurations that may be suitable for use with the system and method include, but are not limited to, personal computers, server computers, laptop devices, and multiprocessor systems. Additional examples include set top boxes, programmable consumer electronics, network PCs, minicomputers, and mainframe computers, distributed computing environments that include any of the above systems or devices, and the like.

The method may be described in the general context of system hardware utilizing firmware configured to perform the methods disclosed herein. The method may also be described in the general context of computer instructions, such as program modules, being executed by a computer. Generally, program modules include routines, programs, objects, components, data structures, etc. that perform particular tasks or implement particular abstract data types. The system and method may also be practiced in distributed computing environments where tasks are performed by remote processing devices that are linked through a communications network. In a distributed computing environment, program modules may be located in both local and remote computer storage media including memory storage devices. For encoding, decoding and display, the data in the MPEG stream can be sent to a computer system such as the computer system in the embodiment of FIG. 5.

The method disclosed herein can be implemented via a general-purpose computing device in the form of a computer 501. The components of the computer 501 can include, but are not limited to, one or more processors or processing units 503, a system memory 512, an encoder/decoder 516, and a system bus 513 that couples various system components including the processor 503 to the system memory 512.

The system bus 513 represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus. The bus 513, and all buses specified in this description can also be implemented over a wired or wireless network connection and each of the sub-systems, including the processor 503, the encoder/decoder 516, a mass storage device 504, an operating system 505, application software 506, data 507, a network adapter 508, system memory 512, an Input/Output Interface 510, a display adapter 509, a display device 511, and a human machine interface 502, can be contained within one or more remote computing devices 514a,b,c at physically separate locations, connected through buses of this form, in effect implementing a fully distributed system.

The encoder/decoder 516 can be hardware, software, or a combination thereof. The encoder/decoder 516 can comprise a separate encoder and a separate decoder, or the encoder/decoder 516 can be a combined encoder and decoder unit. The encoder/decoder 516 can encode a signal (such as a bitstream) or data into a digital format that is acceptable for transmission or storage. The encoder/decoder 516 can convert a signal from the digital format used in transmission or storage into a format that is perceptible. The encoder/decoder 516 can be an integral part of computer 501, or the encoder/decoder 516 can be a physically separate device. The encoder/decoder 516 as a physically separate device can be a physically separate encoder, a physically separate decoder, or a physically separate combined encoder/decoder.

The computer 501 typically includes a variety of computer readable media. Such media can be any available media that is accessible by the computer 501 and includes both volatile and non-volatile media, removable and non-removable media. The system memory 512 includes computer readable media in the form of volatile memory, such as random access memory (RAM), and/or non-volatile memory, such as read only memory (ROM). The system memory 512 typically contains data, which can include video streams, video segments, multiplex files, and the like, such as data 507 and/or program modules such as operating system 505 and application software 506 that are immediately accessible to and/or are presently operated on by the processing unit 503.

The computer 501 may also include other removable/non-removable, volatile/non-volatile computer storage media. By way of example, FIG. 5 illustrates a mass storage device 504 which can provide non-volatile storage of computer code, computer readable instructions, data structures, program modules, and other data for the computer 501. For example, a mass storage device 504 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any number of program modules can be stored on the mass storage device 504, including by way of example, an operating system 505 and application software 506. Each of the operating system 505 and application software 506 (or some combination thereof) may include elements of the programming and the application software 506. Data 507 can also be stored on the mass storage device 504. Data 507 can be stored in any of one or more databases known in the art. Examples of such databases include, DB2®, Microsoft® Access, Microsoft® SQL Server, Oracle®, mySQL, PostgreSQL, and the like. The databases can be centralized or distributed across multiple systems.

A user can enter commands and information into the computer 501 via an input device (not shown). Examples of such input devices include, but are not limited to, a keyboard, pointing device (e.g., a "mouse"), a microphone, a joystick, a serial port, a scanner, and the like. These and other input devices can be connected to the processing unit 503 via a human machine interface 502 that is coupled to the system bus 513, but may be connected by other interface and bus structures, such as a parallel port, game port, or a universal serial bus (USB).

A display device 511 can also be connected to the system bus 513 via an interface, such as a display adapter 509. A computer 501 can have more than one display adapter 509 and a computer 501 can have more than one display device 511. For example, a display device can be a monitor, an LCD (Liquid Crystal Display), or a projector. In addition to the display device 511, other output peripheral devices can include components such as speakers (not shown) and a printer (not shown) which can be connected to the computer 501 via Input/Output Interface 510.

The computer 501 can operate in a networked environment using logical connections to one or more remote computing devices 514a,b,c. By way of example, a remote computing device can be a personal computer, portable computer, a server, a router, a network computer, a peer device or other common network node, and so on. Logical connections between the computer 501 and a remote computing device 514a,b,c can be made via a local area network (LAN) and a general wide area network (WAN). Such network connections can be through a network adapter 508. A network adapter 508 can be implemented in both wired and wireless environments. Such networking environments are commonplace in offices, enterprise-wide computer networks, intranets, the Internet, and the network 515.

For purposes of illustration, application programs and other executable program components such as the operating system 505 are illustrated herein as discrete blocks, although it is recognized that such programs and components reside at various times in different storage components of the computing device 501, and are executed by the data processor(s) of the computer. An implementation of application software 506 may be stored on or transmitted across some form of computer readable media. Computer readable media can be any available media that can be accessed by a computer. By way of example, and not limitation, computer readable media may comprise "computer storage media" and "communications media." "Computer storage media" include volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

Figure 6:
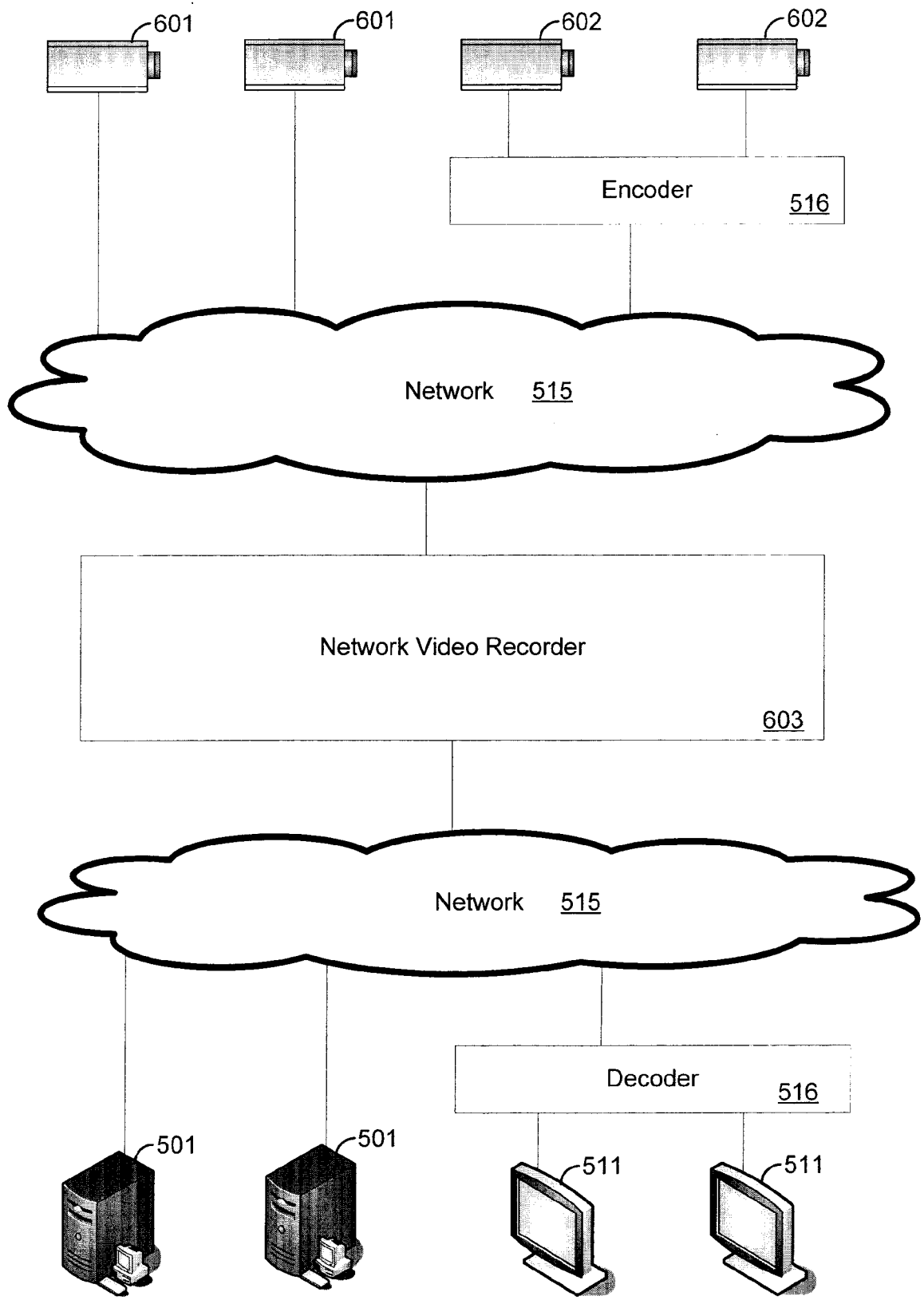
FIG. 6 illustrates an exemplary operating environment.

FIG. 6 illustrates another exemplary operating environment. This exemplary operating environment is only an example of an operating environment and is not intended to suggest any limitation as to the scope of use or functionality of operating environment architecture. Neither should the operating environment be interpreted as having any dependency or requirement relating to any one or combination of components illustrated in the exemplary operating environment.

Video input devices such as Analog Cameras 602 can record and digitally encode video. The Analog Cameras 602 can provide the video to a standalone encoder 516. The standalone encoder 516 encodes the video into digital format and provides the digital video data to a Network Video Recorder 603 via a network 515. Video input devices such as IP Cameras 601 can record and digitally encode video. The IP Cameras 601 can transport the encoded video data via a network 515 to a Network Video Recorder 603.

The Network Video Recorder 603 can include, but is not limited to, a processor 503 (not shown), a mass storage device 504 (not shown), an operating system 505 (not shown), application software 506 (not shown), data 507 (not shown), a network adapter 508 (not shown), and system memory 512 (not shown). The Network Video Recorder 603 can have Application Software 506 (not shown) configured to perform the methods.

The Network Video Recorder 603 can provide encoded video data over a network 515 to a computer 501 for decoding and display. The Network Video Recorder 603 can provide encoded video data over a network 515 to a decoder 516 for conversion to viewable information. The viewable information can be provided to a display device 511.

The processing of the disclosed method can be performed by software components. The disclosed method may be described in the general context of computer-executable instructions, such as program modules, being executed by one or more computers or other devices. Generally, program modules include computer code, routines, programs, objects, components, data structures, etc. that perform particular tasks or implement particular abstract data types. The disclosed method may also be practiced in grid-based and distributed computing environments where tasks are performed by remote processing devices that are linked through a communications network. In a distributed computing environment, program modules may be located in both local and remote computer storage media including memory storage devices. The method may be practiced utilizing firmware configured to perform the methods disclosed herein in conjunction with system hardware.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification.

It will be apparent to those skilled in the art that various modifications and variations can be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method for post frame rate reduction comprising:
receiving a video segment;
detecting a picture boundary, indicating a picture, in the video segment; and
adding the picture to one of a plurality of files based on a sequence guide and a frame sequence constraint, wherein each file has an associated time to live.

2. The method of claim 1, wherein the frame sequence constraint comprises that each picture is added to the next file indicated in the sequence guide.

3. The method of claim 1, wherein the frame sequence constraint comprises that the first picture added to a first file must be a B picture and the first file has the smallest associated time to live of the plurality of files.

4. The method of claim 1, wherein the frame sequence constraint comprises that the first picture added to a first file must be a combined B and P picture and the first file has the smallest associated time to live of the plurality of files.

5. The method of claim 1, wherein the frame sequence constraint comprises that the first picture added to a first file must be a B picture, then a P picture in a second file, then an I picture must be added to the remaining files.

6. The method of claim 1, wherein the plurality of files comprises six files.

7. A method for post frame rate reduction comprising:
receiving a video stream;
separating the video stream into a plurality of video segments;
generating a plurality of sets of files, each set of files associated with a video segment, wherein each file has an associated time to live;
detecting a picture boundary, indicating a picture, in a video segment; and adding the picture to one of the files in the set of files associated with the video segment based on a sequence guide and a frame sequence constraint.

8. The method of claim 7, wherein the frame sequence constraint comprises that each picture is added to the next file indicated in the sequence guide.

9. The method of claim 7, wherein the frame sequence constraint comprises that the first picture added to a first file must be a B picture and the first file has the smallest associated time to live of the plurality of files.

10. The method of claim 7, wherein the frame sequence constraint comprises that the first picture added to a first file must be a combined B and P picture and the first file has the smallest associated time to live of the plurality of files.

11. The method of claim 7, wherein the frame sequence constraint comprises that the first picture added to a first file must be a B picture, then a P picture in a second file, then an I picture must be added to the remaining files.

12. The method of claim 7, wherein the video stream is an M-JPEG stream.

13. The method of claim 7, wherein the video stream is an MPEG stream.

14. A method for generating a sequence guide comprising:
determining a plurality of files to divide a video segment into;
determining a sequence guide length;
generating an empty sequence guide; and
generating a complete sequence guide following a frame sequence guide constraint.

15. The method of claim 14, wherein each file has an associated time to live.

16. A method comprising:
receiving a request for a desired frame rate;
based on the desired frame rate, selecting a subset of unique multiplex file identifiers from a plurality of unique multiplex file identifiers in a sequence guide, wherein each unique multiplex file identifier among the plurality of unique multiplex file identifiers is repeated in the sequence guide at an interval unique to the respective unique multiplex file identifier;
opening a multiplex file for each of the selected unique multiplex file identifiers, wherein each opened multiplex file is associated with one of the selected unique multiplex file identifiers and has a unique time-to-live, and wherein a length of each unique time-to-live is inversely proportional to a quantity of unique multiplex file identifiers present in the sequence guide for the opened multiplex file to which the unique time-to-live is assigned; and
reading from each of the opened multiplex files in an order in which the respective associated unique multiplex file identifiers are configured in the sequence guide.

17. The method of claim 16 further comprising:
displaying the video stream.

18. The method of claim 16 further comprising:
up-sampling a portion of the video stream to the requested frame rate.

19. The method of claim 18, wherein the video stream is an MPEG stream and up-sampling comprises substituting a missing video picture with an identity P picture.

20. A method comprising:
receiving a request for a desired frame rate;
based on the desired frame rate, selecting a subset of unique multiplex file identifiers from a plurality of unique multiplex file identifiers in a sequence guide, wherein each unique multiplex file identifier among the plurality of unique multiplex file identifiers is repeated in the sequence guide at an interval unique to the respective unique multiplex file identifier;
determining that a multiplex file for each of the selected unique multiplex file identifiers has been deleted;
based on the desired frame rate, selecting a second subset of unique multiplex file identifiers from the plurality of unique multiplex file identifiers in the sequence guide,
opening a second multiplex file for each of the second selected unique multiplex file identifiers, wherein each second opened multiplex file is associated with one of the second selected unique multiplex file identifiers and has a unique time-to-live, and wherein a length of each unique time-to-live is inversely proportional to a quantity of unique multiplex file identifiers present in the sequence guide for the second opened multiplex file to which the unique time-to-live is assigned; and
reading from each of the second opened multiplex files in an order in which the associated second unique multiplex file identifiers are configured in the sequence guide.

21. The method of claim 20 further comprising:
displaying the video stream.

22. The method of claim 20, wherein a PDU Header is used to maintain synchronization while reading from a file.

23. The method of claim 20, wherein a PDU Header is used to detect out of sequence pictures.

24. A computer readable storage device with computer executable instructions embodied thereon for post performing operations comprising:
generating a sequence guide comprising a plurality of unique multiplex file identifiers, wherein each unique multiplex file identifier among the plurality of unique multiplex file identifiers is repeated in the sequence guide at an interval unique to the respective unique multiplex file identifier;
generating a plurality of multiplex files by generating one multiplex file for each of the unique multiplex file identifiers among the plurality of unique multiplex file identifiers; and
assigning a unique time-to-live to each of the plurality of multiplex files, wherein a length of each unique time-to-live is inversely proportional to a quantity of unique multiplex file identifiers present in the sequence guide for the multiplex file to which the unique time-to-live is assigned.

25. The computer readable storage device of claim 24, wherein the sequence guide comprises a plurality of slots, and wherein a first unique multiplex file identifier among the plurality of unique multiplex file identifiers is configured at each alternate slot in the sequence guide.

26. The computer readable storage device of claim 25, wherein a second unique multiplex file identifier among the plurality of unique multiplex file identifiers is configured at each remaining alternate slot in the sequence guide, wherein remaining alternate slots comprise slots among the plurality of slots that are not configured with the first unique multiplex file identifier.

27. The computer readable storage device of claim 24, wherein a number of slots configured in the sequence guide is $2^{M-1}$, where M is a quantity of multiplex files in the plurality of multiplex files.

28. The computer readable storage device of claim 24, wherein the sequence comprises a string of characters.

29. The computer readable storage device of claim 24, wherein the plurality of multiplex files comprises six multiplex files.

30. A computer readable storage device with computer executable instructions embodied thereon for performing operations comprising:

generating a sequence guide comprising a plurality of unique multiplex file identifiers, wherein each unique multiplex file identifier among the plurality of unique multiplex file identifiers is repeated in the sequence guide at an interval unique to the respective unique multiplex file identifier;

generating a plurality of multiplex files by generating one multiplex file for each of the unique multiplex file identifiers among the plurality of unique multiplex file identifiers;

assigning a unique time-to-live to each of the plurality of multiplex files, wherein each unique time-to-live is inversely proportional to a quantity of unique multiplex file identifiers present in the sequence guide for the multiplex file to which the unique time-to-live is assigned receiving a video stream;

separating the video stream into a plurality of video segments;

selecting a multiplex file for each video segment among the plurality of video segments by determining a unique multiplex file identifier associated with the multiplex file based on an order in which the unique multiplex file identifiers are configured in the sequence guide; and storing each of the plurality of video segments in the multiplex file selected for the respective video segment.

31. The computer readable storage device of claim 30, selecting the multiplex file for each video segment among the plurality of video segments is based, at least in part, on a frame sequence constraint.

32. The computer readable storage device of claim 31, wherein the frame sequence constraint comprises that a first video segment of the plurality of video segments stored in a first multiplex file of the plurality of multiplex files must be a B picture and the first multiplex file has the smallest associated time to live of the plurality of multiplex files.

33. The computer readable storage device of claim 31, wherein the frame sequence constraint comprises a first video segment of the plurality of video segments stored in a first multiplex file of the plurality of multiplex files must be a combined B and P picture and the first multiplex file has the smallest associated time to live of the plurality of multiplex files.

34. The computer readable storage device of claim 31, wherein the frame sequence constraint comprises that a first video segment of the plurality of video segments stored in a first multiplex file of the plurality of multiplex files must be a B picture, then a second video segment of the plurality of video segments stored in a second multiplex file of the plurality of multiplex files must be a P picture then a third video segment of the plurality of video segments stored in a third multiplex file of the plurality of multiplex files must be an I picture.

35. The computer readable storage device of claim 30, wherein the video stream is an M-JPEG stream.

36. The computer readable storage device of claim 30, wherein the video stream is an MPEG stream.

37. A computer readable storage device with computer executable instructions embodied thereon for generating performing operations comprising:

storing each of a plurality of video segments in a respective multiplex file among a plurality of multiplex files, wherein each multiplex file among the plurality of multiplex files comprises a time-to-live unique among a time-to-lives configured for each of the plurality of multiplex files, wherein a length of each time-to-live for each respective multiplex file is inversely proportional to a quantity of multiplex file identifiers associated with the respective multiplex file configured in a sequence guide;

determining that a first time-to-live for a first multiplex file among the plurality of multiplex files has expired; and deleting the first multiplex file.

38. The computer readable storage device of claim 37, wherein a number of slots configured in the sequence guide is $2^{M-1}$, where M is a quantity of multiplex files in the plurality of multiplex files, and wherein each slot comprises one multiplex file identifier.

39. A computer readable storage device with computer executable instructions embodied thereon for performing operations comprising:

receiving a request for a desired frame rate;

based on the desired frame rate, selecting a subset of unique multiplex file identifiers from a plurality of unique multiplex file identifiers in a sequence guide, wherein each unique multiplex file identifier among the plurality of unique multiplex file identifiers is repeated in the sequence guide at an interval unique to the respective unique multiplex file identifier;

opening a multiplex file for each of the selected unique multiplex file identifiers, wherein each opened multiplex file is associated with one of the selected unique multiplex file identifiers and has a unique time-to-live, and wherein a length of each unique time-to-live is inversely proportional to a quantity of unique multiplex file identifiers present in the sequence guide for the opened multiplex file to which the unique time-to-live is assigned; and reading from each of the opened multiplex files in an order in which the respective associated unique multiplex file identifiers are configured in the sequence guide.

40. The computer readable storage device of claim 39, further comprising displaying a video stream comprising content of the opened multiplex files.

41. The computer readable storage device of claim 39 further comprising up-sampling content of the opened multiplex files to the requested frame rate.

42. The computer readable storage device of claim 41, wherein the video stream is an MPEG stream and up-sampling comprises substituting a missing video picture with an identity P picture.

43. A computer readable storage device with computer executable instructions embodied thereon for performing operations comprising:

receiving a request for a desired frame rate;

based on the desired frame rate, selecting a subset of unique multiplex file identifiers from a plurality of unique multiplex file identifiers in a sequence guide, wherein each unique multiplex file identifier among the plurality of unique multiplex file identifiers is repeated in the sequence guide at an interval unique to the respective unique multiplex file identifier;

determining that a multiplex file for each of the selected unique multiplex file identifiers has been deleted;

based on the desired frame rate, selecting a second subset of unique multiplex file identifiers from the plurality of unique multiplex file identifiers in the sequence guide, opening a second multiplex file for each of the second selected unique multiplex file identifiers, wherein each second opened multiplex file is associated with one of the second selected unique multiplex file identifiers; and reading from each of the second opened multiplex files in an order in which the associated second unique multiplex file identifiers are configured in the sequence guide.

44. The computer readable storage device of claim 43 wherein the operations further comprise displaying a video stream comprising content of the second opened multiplex files.

45. The computer readable storage device of claim 43, wherein a PDU Header is used to maintain synchronization while reading from each of the second opened multiplex files.

46. A system for post frame rate reduction comprising:
a video input device;
a memory, coupled to the video input device and configured for storing video;
a processor, coupled to the memory, wherein the processor is configured for performing the steps of:
receiving a video segment;
detecting a picture boundary, indicating a picture, in the video segment; and
adding the picture to one of a plurality of files based on a sequence guide and a frame sequence constraint wherein each file has an associated time to live.

47. The system of claim 46, wherein the frame sequence constraint comprises that each picture is added to the next file indicated in the sequence guide.

48. The system of claim 46, wherein the frame sequence constraint comprises that the first picture added to a first file must be a B picture and the first file has the smallest associated time to live of the plurality of files.

49. The system of claim 46, wherein the frame sequence constraint comprises that the first picture added to a first file must be a combined B and P picture and the first file has the smallest associated time to live of the plurality of files.

50. The system of claim 46, wherein the frame sequence constraint comprises that the first picture added to a first file must be a B picture, then a P picture in a second file, then an I picture must be added to the remaining files.

51. The system of claim 46, wherein the plurality of files comprises six files.

52. A system for post frame rate reduction comprising:
a video input device;
a memory, coupled to the video input device and configured for storing video;
a processor, coupled to the memory, wherein the processor is configured for performing the steps of:
receiving a video stream;
separating the video stream into a plurality of video segments;
generating a plurality of sets of files, each set of files associated with a video segment wherein each file has an associated time to live;
detecting a picture boundary, indicating a picture, in a video segment; and adding the picture to one of the files in the set of files associated with the video segment based on a sequence guide and a frame sequence constraint.

53. The system of claim 52, wherein the frame sequence constraint comprises that each picture is added to the next file indicated in the sequence guide.

54. The system of claim 52, wherein the frame sequence constraint comprises that the first picture added to a first file must be a B picture and the first file has the smallest associated time to live of the plurality of files.

55. The system of claim 52, wherein the frame sequence constraint comprises that the first picture added to a first file must be a combined B and P picture and the first file has the smallest associated time to live of the plurality of files.

56. The system of claim 52, wherein the frame sequence constraint comprises that the first picture added to a first file must be a B picture, then a P picture in a second file, then an I picture must be added to the remaining files.

57. The system of claim 52, wherein the video stream is an M-JPEG stream.

58. The system of claim 52, wherein the video stream is an MPEG stream.

59. A system for generating a sequence guide comprising:
a memory configured for storing video;
a processor, coupled to the memory, wherein the processor is configured for performing the steps of:
determining a plurality of files to divide a video segment into;
determining a sequence guide length;
generating an empty sequence guide; and
generating a complete sequence guide following a frame sequence guide constraint.

60. The system of claim 59, wherein each file has an associated time to live.

61. A system comprising:
a display device;
a memory coupled to the display device and configured for storing video;
a processor coupled to the memory, wherein the processor is configured to perform operations comprising:
receiving a request for a desired frame rate;
based on the desired frame rate, selecting a subset of unique multiplex file identifiers from a plurality of unique multiplex file identifiers in a sequence guide, wherein each unique multiplex file identifier among the plurality of unique multiplex file identifiers is repeated in the sequence guide at an interval unique to the respective unique multiplex file identifier;
opening a multiplex file for each of the selected unique multiplex file identifiers, wherein each opened multiplex file is associated with one of the selected unique multiplex file identifiers and has a unique time-to-live, and wherein a length of each unique time-to-live is inversely proportional to a quantity of unique multiplex file identifiers present in the sequence guide for the opened multiplex file to which the unique time-to-live is assigned; and
reading from each of the opened multiplex files in an order in which the respective associated unique multiplex file identifiers are configured in the sequence guide.

62. The system of claim 61 further comprising:
displaying the video stream.

63. The system of claim 61 further comprising:
up-sampling a portion of the video stream to the requested frame rate.

64. The system of claim 63, wherein the video stream is an MPEG stream and up-sampling comprises substituting a missing video picture with an identity P picture.

65. A system comprising:
a display device;
a memory coupled to the display device and configured for storing video;
a processor coupled to the memory, wherein the processor is configured to perform operations comprising:
receiving a request for a desired frame rate;
based on the desired frame rate, selecting a subset of unique multiplex file identifiers from a plurality of unique multiplex file identifiers in a sequence guide, wherein each unique multiplex file identifier among the plurality of unique multiplex file identifiers is repeated in the sequence guide at an interval unique to the respective unique multiplex file identifier;

determining that a multiplex file for each of the selected unique multiplex file identifiers has been deleted;

based on the desired frame rate, selecting a second subset of unique multiplex file identifiers from the plurality of unique multiplex file identifiers in the sequence guide, opening a second multiplex file for each of the second selected unique multiplex file identifiers, wherein each second opened multiplex file is associated with one of the second selected unique multiplex file identifiers and has a unique time-to-live, and wherein a length of each unique time-to-live is inversely proportional to a quantity of unique multiplex file identifiers present in the sequence guide for the second opened multiplex file to which the unique time-to-live is assigned; and reading from each of the second opened multiplex files in an order in which the associated second unique multiplex file identifiers are configured in the sequence guide.

66. The system of claim 65 further comprising:
displaying the video stream.

67. The system of claim 65, wherein a PDU Header is used to maintain synchronization while reading from a file.

68. The system of claim 65, wherein a PDU Header is used to detect out of sequence pictures.

\* \* \* \* \*